(Model.)

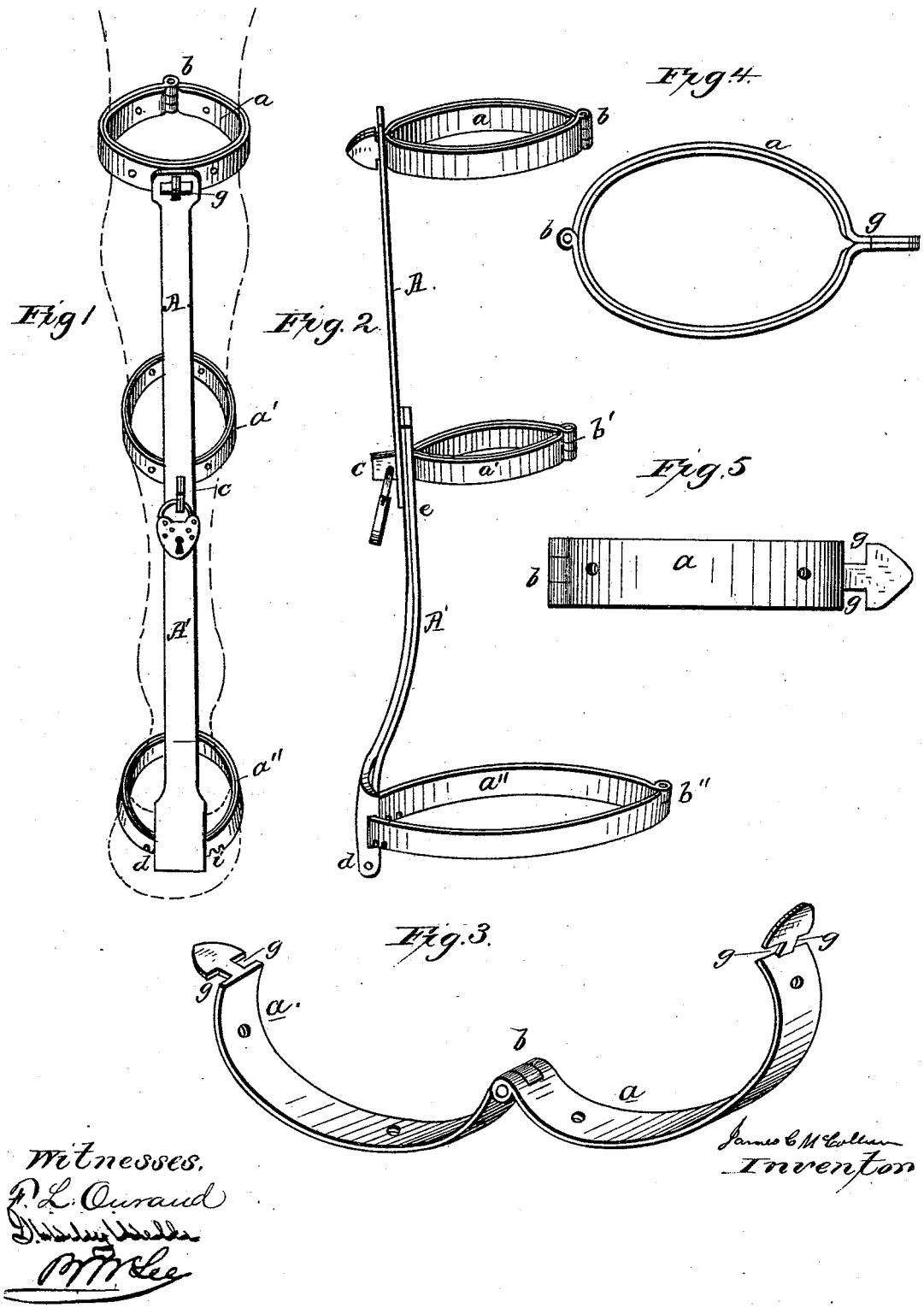

J. C. McCOLLUM.
SHACKLE FOR HORSES.

No. 251,615. Patented Dec. 27, 1881.

3 Sheets—Sheet 2.

Witnesses,
F. L. Ourand
B. F. Lee

James C. McCollum
Inventor.

(Model.)
3 Sheets—Sheet 3.
J. C. McCOLLUM.
SHACKLE FOR HORSES.
No. 251,615. Patented Dec. 27, 1881.
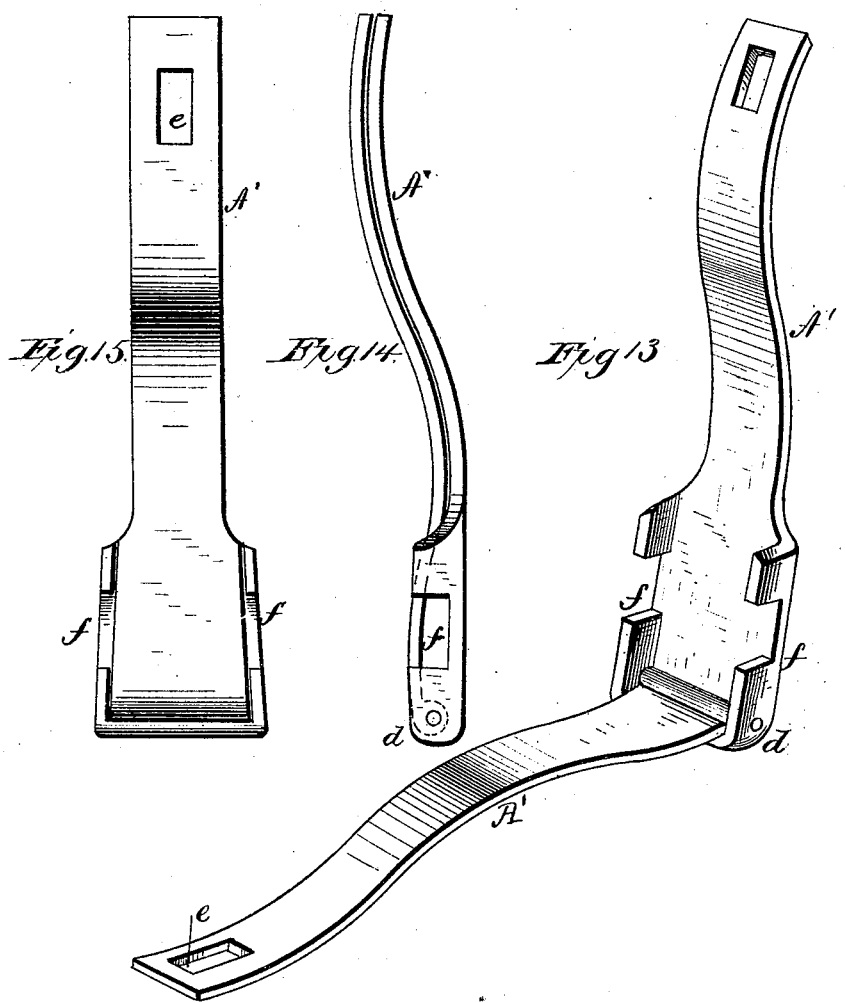
Witnesses,
Franck L. Ourand
James C. McCollum
Inventor

UNITED STATES PATENT OFFICE.

JAMES C. McCOLLUM, OF LOS ANGELES, CALIFORNIA, ASSIGNOR TO J. K. MAXWELL, OF SAME PLACE.

SHACKLE FOR HORSES.

SPECIFICATION forming part of Letters Patent No. 251,615, dated December 27, 1881.

Application filed March 21, 1881. (Model.)

*To all whom it may concern:*

Be it known that I, JAMES C. McCOLLUM, of Los Angeles, in the county of Los Angeles, State of California, have invented a new and useful shackle for shackling horses and other animals to prevent them from jumping fences, straying, or being stolen; and I do hereby declare that the following is a full, clear, and exact description of the construction and operation of the same, reference being had to the annexed drawings, making a part of this specification, in which—

Figure 6:
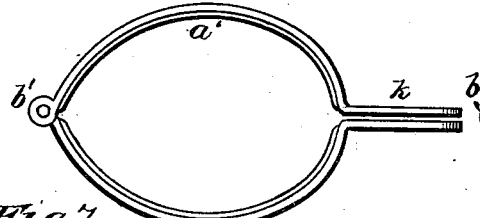
Figure 9:
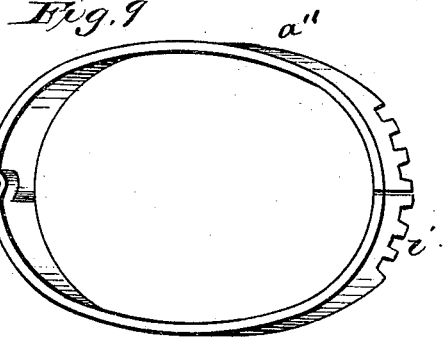
Figure 7:
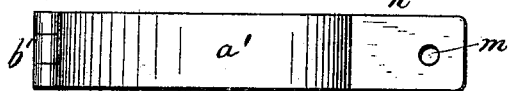
Figure 8:
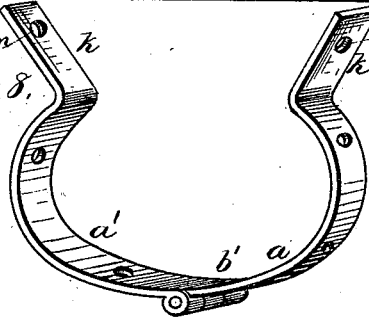
Figure 10:
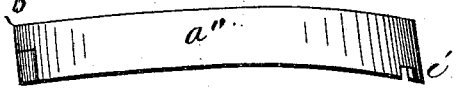
Figure 11:
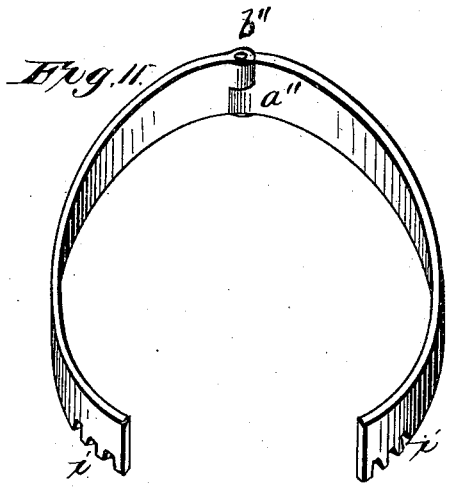
Figure 12:
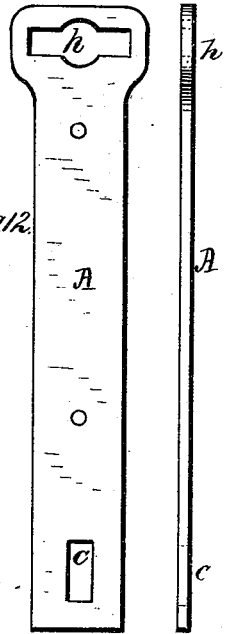

Figure 1 is a front view of my improved shackle as applied to the leg of a horse; Fig. 2, a side view of the same removed; Fig. 3, a perspective view of the ring used above the knee and in an open condition; Fig. 4, a plan view of the same; Fig. 5, a side view of the same. Fig. 6 is a plan view of the ring to be used below the knee, closed; Fig. 7, a side view of the same; Fig. 8, a perspective view of the same shown in an open condition. Fig. 9 is a perspective of the lowest or hoof ring closed; Fig. 10, a side view of the same; Fig. 11, a perspective view of the same partially open. Fig. 12 is a front and edge view of a bar employed for connecting the rings located above and immediately below the knee. Fig. 13 is a perspective open view of a hinged double bar employed for grasping the hoof-ring and connecting with the bar, Fig. 12, and upper rings. Fig. 14 is an edge view of the same closed, and Fig. 15 is a front view of the same.

Similar letters denote like parts in the several figures.

My improved shackle consists of three rings, $a$ $a'$ $a''$, adapted to grasp respectively the leg above the knee, just below the same, and just above the hoof. The upper ring, $a$, is hinged at $b$, and its free ends are formed with arrow-heads, as clearly seen at $g$, Figs. 2 and 5, so that they may be passed through a slot, $h$, in a connecting-bar, A, and locked therein by turning into position (shown at Figs. 1 and 2) at right angles to the longitudinal direction of said slot $h$. The second ring, $a'$, is also made in two parts, hinged at $b'$, and its free ends $k$ straightened out, as clearly shown at Fig. 6, and adapted to pass through a slot, $c$, in the lower end of bar A, and also through a slot, $e$, in upper end of bar A', (see Figs. 13 and 15,) where the three are locked together by an ordinary lock passing through holes $m$, as seen at Figs. 1, 2, 7, and 8. The lower ring, $a''$, which surrounds the ankle, is hinged at $b''$, and at its front ends are provided a series of slots, $i$, on the under edges thereof, adapted to embrace the metal at one end of the slots $f$ in the sides of the box portion of bar A'. (See Fig. 13.)

The bar A is made of metal, in two parts, hinged together at $d$, the front half of said bar having its lower end boxed on three sides, as most clearly seen at Fig. 13, so that when the ends of ring $a''$ are placed in the slot $f$ the closing together of the two parts of bar A' will confine the ring $a''$ in position, and said ring, by reason of the series of slots $i$, may be made larger or smaller, as circumstances may require. The upper ends of the two portions of the bar A' are provided with elongated slots $e$, of same dimensions as the slot $c$ in the lower end of the upper bar, A, so that the bars A A' and second ring, $a'$, may all be secured together, as hereinafter explained.

When the several parts are all secured in position upon the leg of a horse or other animal, as clearly shown at Fig. 1, it will prove as a perfect prevention to jumping, and by releasing the lock the several parts may be readily and rapidly detached from each other and from the animal.

The rings and bars may all be made of cast metal, and of such weight and proportions as to secure comparative comfort and strength, and, if desirable, the several parts, and particularly the rings, may be covered with leather or other suitable material.

What I claim as new, and desire to secure by Letters Patent, is—

1. A shackle for horses, consisting of the rings $a$ $a'$ $a''$, constructed as described, in combination with the bars A and A', constructed as described, the whole adapted to be secured in position upon the leg of an animal, in the manner described, by a lock.

2. The lower connecting-bar, A', made in two parts hinged together, the lower end of the front portion of said bar being boxed, as described, and formed with openings $f$ in its sides adapted to receive and lock the ends of the lower ring, $a''$, substantially as described.

3. In combination with the lower bar, A', formed as described, with the slots $f$, the ring $a''$, having its front ends notched at $i$, as shown, whereby they may be adjustably secured in position, as shown and described.

JAMES C. McCOLLUM.

Witnesses:
G. WILEY WELLS,
B. W. LEE.